Figure 1:
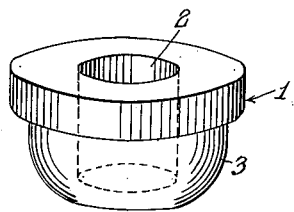

March 18, 1941.  G. P. LEISTENSNIDER  2,235,438
LUBRICATED PACKING
Filed Nov. 27, 1936

George G. Leistensnider INVENTOR.
BY Wm. S. Pritchard
ATTORNEY.

Patented Mar. 18, 1941

2,235,438

UNITED STATES PATENT OFFICE 2,235,438

LUBRICATED PACKING

George P. Leistensnider, West Englewood, N. J., assignor to Metalastic Manufacturing Corporation, a corporation of New Jersey Application November 27, 1936, Serial No. 113,043

1 Claim. (Cl. 106—7.6)

This invention relates to packing compositions and packing produced therefrom. More particularly, this invention relates to packings for use in mechanical devices for the purpose of sealing joints or connections and between parts which preferably have relative movement.

Prior to the instant invention, packings for use in mechanical devices for sealing joints or connections and between parts having relative movement contained fibers such as cellulosic fibers or asbestos. When such packings contacted with water or moisture, the fibers absorbed the same and swelled and softened to a substantial degree. As a consequence, the packing exuded on to the outer surface and/or was carried out by means of the moving parts. This can be readily understood by considering, for example, an ordinary hot water faucet. In such a device, when the packing contacted with the water, the cellulose and asbestos fibers therein swelled, causing the packing to exude on to and stain the bonnet of the faucet. Also, due to the movement of the stem during opening and closing of the valve, the softened packing would adhere to and stain the stem and very often was deposited on the bonnet of the faucet.

The packings made prior to this invention also contained graphite which imparted self-lubricating properties to the packing. Graphite is black in color and as a consequence imparted this color to the packing. Referring now again to the faucet previously mentioned, the packing deposited on the bonnet, either by exudation or by the movement of the stem, stained the bonnet and made the faucet unsightly in appearance.

Another disadvantage of the prior art packing resulted from the electrolytic action of some of the ingredients of the packing with the metal with which it contacted. Such action resulted in a scoring or equivalent action of the metal parts contacting with the packing. Such effects were produced by the graphite and/or the metal particles of the packing.

The art has long desired a packing which is substantially white in color. When such a packing contacts in any manner whatsoever with, for example, the bonnet or stem of a faucet and particularly one made of or surfaced (plated) with a white or silvery metal, the faucet is not stained.

I have found that I can overcome the above-mentioned defects and disadvantages of the prior art packing and produce a packing which is white in color, resilient, self-lubricated, waterproof, inert, has no electrolytic action with the metal with which it contacts and has a long life.

It is an object of this invention to provide a white packing.

Another object of this invention is to provide a packing which is not deleteriously affected by water.

Another object of this invention is to provide a packing free of graphite and fibers deleteriously affected by water.

Still another object of this invention is to provide a packing which does not electrolytically react with metal with which it may contact.

Other objects will appear from the following description, appended claims and accompanying drawing wherein the single figure is a perspective view of a packing constituting one embodiment of this invention.

Referring to the figure constituting the drawing, the reference numeral 1 designates an extruded die-formed packing having a bore 2 extending therethrough. The wall 3 of the packing may be of any shape or form or exterior configuration, depending on the ultimate use of the packing. In the form illustrated the packing is of the type to be used in faucets and hence the shape and form thereof have been shown to conform to the interior surface of the bonnet of the faucet in which it is to be positioned. It is to be understood that the invention is not restricted to any particular form or shape of packing, since it is obvious that the packing may be tubular, annular or solid and/or of any shape or form as may be dictated by the ultimate use of the packing.

The packing is formed of a composition which consists essentially of a fibrous material, a lubricant, a filler or extender and a binder, all hereinafter more fully explained.

As the fibrous material, this invention contemplates a fibrous material which is inherently waterproof, whereby it will not be deleteriously affected by water or moisture. It preferably should also possess resiliency, whereby a resilient effect is imparted to the final packing. Also, it should be of such a nature that it will not take a permanent set under the conditions which the packing is to be used. Thus, for example, if the packing is to be used in a water faucet, it should not take a permanent set under the temperature conditions of the water delivered thereby and the room in which it is mounted. Since the packing is to be substantially white in color, the fibers should also be substantially white in color. As a specific fibrous material possessing all of the aforementioned properties may be mentioned kapok. Kapok is cottony or silky vegetable fiber covering the seeds of a tropical tree (*Ceiba pentandra*) of the silk-cotton family (*Bombacae*). When kapok is used as one of the ingredients, it may be in the crude state. However, kapok fibers which have been refined, i. e. seeds and foreign matter removed by combing or carding and the oils removed by heating or otherwise, are preferred.

The packing in the preferred form thereof is self-lubricated. To obtain this property a lubricant is incorporated into the composition of which the packing is formed. The lubricant must be of a color which does not interfere with the desired white color of the final packing and which also imparts the lubricating properties to the packing under the conditions which the packing is used. Though various lubricants may be used, metallic soaps and particularly the soaps of the alkaline earth metals are preferred. Calcium stearate is the most preferred, since it is extremely insoluble and also aids in imparting waterproofing characteristics and properties to the final packing.

As the binder, any substance which was originally liquid or a solid which can be dissolved in an appropriate solvent and which upon conversion to a solid state by, for example, heat will form a flexible compound, may be used. Of course, due to the color desired in the final packing, the color of the binder must be such as not to interfere with the white color of the final packing. As illustrative examples of substances which may be used for the binder may be mentioned treated oils, rubber, pale crepe rubber, balata, gutta percha, caoutchouc, synthetic rubbers such as the polymers of isoprene, butadiene and their homologues, "Duprene," latex, etc. When a solid substance, such as rubber or rubber substance, is to constitute the binder, it is dissolved in an appropriate volatile solvent to form a cement, depending on the nature of the selected binder. When latex is used, there is preferably incorporated therein a wetting agent, whereby the latex will be caused to adhere to the kapok fibers. In the preferred form of the invention, a sulphurless compound of rubber is dissolved in any of the well-known aliphatic hydrocarbon solvents to form a cement and this solution or dispersion employed as a binder in the manner more fully hereinafter set forth. Generally, the binder in the liquid state should be characterized by a viscosity such as will produce a thin liquid cement, so that the other ingredients may be wetted therewith. Such a cement can be secured if the cement contains 12% to 30% by weight of solids.

When rubber or rubber substitutes, etc. are employed as the binders, suitable antoxidants and/or vulcanizing agents may also be incorporated. In no case should the quantity of the other added substances be such as to reduce the desired flexibility of the binder in its final set condition in the product.

When the aforementioned ingredients, i. e. kapok, a lubricant and a binder, are admixed, there results a mass which in some cases cannot be extruded to form a satisfactory tubular or annular packing. When this is the case, this limitation can be overcome by incorporating a filler or extender into the mass to impart to the composition sufficient body to permit extrusion thereof and produce satisfactory tubular or annular packings. As the extender or filler, any inert white or colorless pigment, mica, ground cork, etc., may be used. In the preferred embodiment of the invention asbestine or fibrous talc is employed as the filler and the extender.

Though in the preferred embodiment of the invention the composition contains the ingredients previously described, other well-known ingredients of packing compositions may be used. Thus, powdered metals, cotton, hemp, asbestos, etc., may be used.

The proportions of the ingredients may vary within wide limits. In the case of tubular or annular packings, the thickness of the wall thereof determines the viscosity of the mass.

In order to more clearly indicate the nature of the composition, there is hereafter set forth a specific, illustrative embodiment of a composition which has given satisfactory results:

| Ingredients | Proportions by weight |
|---|---|
| Binder—sulphurless rubber compound dissolved in volatile solvent (12% to 30% solids) | *Pounds* 34 |
| Kapok | 6 |
| Calcium stearate | 3 |
| Asbestine or fibrous talc | 18 to 24 |

It is apparent that the specific proportions hereinbefore set forth may be varied within limits depending on the properties desired in the final product.

In order to make, for example, an annular packing, the selected ingredients are mixed in any suitable equipment until the kapok is coated with the binder and the extender uniformly incorporated throughout the mass. A sufficient quantity of the solvent of the binder is removed as by heating to render the mass more amenable to extrusion. This, of course, depends on the nature of the final product. When an annular product is to be made, the composition may be continuously or intermittently extruded through an annular die to produce a tubular material of definite or indefinite length. If desired, prior to the composition passing through the die, the kapok fibers may be aligned so that they are substantially parallel to the longitudinal axis of the bore as described in application Serial No. 594,364. The tubular material is then subjected to a treatment such as heat, whereby the residual solvent is removed. The tubular material is then cut into sections of the desired length, after which the individual sections are placed in a die and molded into the finished form. The molding also densifies the packing. The articles are then finally vulcanized. Obviously, if desired, all or several of the steps of the process may be performed simultaneously and continuously. Also, two or more of the steps may be performed in one operation.

Though the preferred embodiment of the invention appertains to die-extruded, annular, tubular or solid packings, the invention is not restricted thereto. The principles of the invention may be used in compounding plastic, self-lubricating packing compositions. In such compositions, the rubber or like binders may be substituted by greases, soap-bodied mineral oils, heavy-bodied lubricating oils, etc.

A packing produced in accordance with this invention is substantially white in color, waterproof, self lubricated, inert, resilient, and does not electrolytically react with metals with which it may contact. It does not score, pit or corrode the metal with which it contacts. The packing is admirably suited for use under conditions where low pressure steam and/or temperatures up to 250° F. prevail or are reached. Under such conditions, the kapok in the packing does not appreciably swell and hence it does not exude or adhere to moving parts. Even if it did, since it is substantially white in color, no unsightly stains will be produced.

Since it is obvious that various changes may be made in the specific details hereinabove set forth, this invention is not restricted thereto except as set forth in the appended claim.

I claim:

A packing containing kapok, calcium stearate, fibrous talc and rubber.

GEORGE P. LEISTENSNIDER.